United States Patent [19]

Patton, Jr. et al.

[11] 4,324,867
[45] Apr. 13, 1982

[54] PROCESS FOR THE PREPARATION OF MOLDED POLYURETHANE-POLYUREA ELASTOMERS AND MOLDED PARTS PREPARED THEREBY

[75] Inventors: John T. Patton, Jr., Wyandotte; John P. Rupert, Woodhaven, both of Mich.

[73] Assignee: BASF Wyandotte Corporation, Wyandotte, Mich.

[21] Appl. No.: 194,503

[22] Filed: Oct. 6, 1980

[51] Int. Cl.$^3$ .............................................. C08G 18/14
[52] U.S. Cl. .................................... 521/159; 521/163; 528/63; 528/64; 528/76; 528/83; 252/182
[58] Field of Search ................. 521/159, 163; 528/63, 528/64, 76, 83; 252/182

[56] References Cited

U.S. PATENT DOCUMENTS

| | | | |
|---|---|---|---|
| 3,428,610 | 2/1969 | Klebert | 528/59 |
| 4,048,105 | 9/1977 | Salisbury | 521/163 |

FOREIGN PATENT DOCUMENTS

| | | |
|---|---|---|
| 1408943 | 10/1975 | United Kingdom . |
| 1534258 | 11/1978 | United Kingdom . |

*Primary Examiner*—Maurice J. Welsh
*Attorney, Agent, or Firm*—David L. Hedden; Joseph D. Michaels

[57] ABSTRACT

A process for preparing molded polyurethane-polyurea elastomers comprising reacting an organic polyisocyanate and a reactive polyol composition, said reactive polyol composition comprising (a) a polyol having an equivalent weight of from 700 to 4,000 and a functionality from 2 to 6; and (b) a reactive aromatic diamine which is soluble in said polyol at use temperatures and concentrations, has a $pK_b$ value greater than 10, and has the following structural formula:

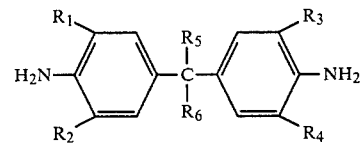

wherein $R_1$, $R_2$, $R_3$, and $R_4$ individually are radicals selected from the group consisting of hydrogen and alkyl radicals of 1 to 4 carbon atoms, and at least one of the alkyl radicals in each ring is a non-linear alkyl radical selected from the group consisting of isopropyl, isobutyl, and tertiary butyl radicals, and wherein $R_5$ and $R_6$ are radicals individually selected from the group consisting of hydrogen and alkyl radicals of 1 to 4 carbon atoms.

The process is preferably carried out by means of reaction injection molding techniques. The process of this invention can be used to prepare large molded parts for automobiles such as facia, bumpers, hoods, doors, and fenders.

9 Claims, No Drawings

PROCESS FOR THE PREPARATION OF MOLDED POLYURETHANE-POLYUREA ELASTOMERS AND MOLDED PARTS PREPARED THEREBY

BACKGROUND OF THE INVENTION

1. Field of the Invention

The subject matter of this invention pertains to a process for preparing molded polyurethane-polyurea elastomers by reacting an organic polyisocyanate with a reactive polyol composition which contains certain diaminodiphenylmethane compounds as chain extenders.

2. Description of the Prior Art

It is known that polyurethane compositions can be prepared by reacting an organic polyisocyanate with a compound containing at least two active hydrogen atoms as determined by the well known Zerewitinoff method. However, one of the challenges facing those who work in the polyurethane field is to prepare molded polyurethane parts. It has been especially challenging to prepare large molded parts for automobiles such as facia, bumpers, hoods, doors, and fenders. Such parts must have good mechanical properties. In particular, the changes in modulus of elasticity with change in temperature should be minimized. The parts must be sufficiently rigid at high temperatures and sufficiently flexible at low temperatures.

Not only must the parts have good mechanical properties, but the ingredients used in preparing the polyurethane parts must lend themselves to reaction injection molding (RIM) processing. The ingredients must not plug up the feed lines or the mix heads, and must allow quick injection times. The mold flow characteristics and the reactivity of the ingredients must be such that the mold cavities are completely filled so that the parts will be completely shaped. On the other hand, demold times must be minimized to allow faster cycle times.

One of the primary methods of making polyurethane products with improved mechanical properties, is to add a chain extender, such as a low molecular weight diol, to the polyurethane formulation. Although chain extenders such as 1,4-butanediol will provide polyurethane products with improved mechanical properties, the demolding time can be as long as 1 to 4 minutes. Also, the compositions do not possess adequate modulus at higher temperatures.

Because of the limitations of using low molecular weight diols such as 1,4-butanediol as chain extenders, aromatic amines have been used as chain extenders in polyurethane formulations. These have been used because the reaction of aromatic amines with organic polyisocyanates will result in polymers with an increased proportion of urea linkages. The urea linkages improve the mechanical properties of the products, especially their resistance to higher temperatures.

U.S. Pat. No. 3,428,610, for instance, discloses the use of aromatic diamines as chain extenders. The aromatic diamines used have (a) one linear alkyl substituent of 1 carbon atom to 3 carbon atoms in an ortho position to one amino group and two linear alkyl substituents of 1 carbon atom to 3 carbon atoms in both ortho positions to the other amino group, or (b) two linear alkyl substituents of 1 carbon atom to 3 carbon atoms in both ortho positions of each of the amino groups. British Pat. No. 1,408,943 broadly discloses the use of diaminodiphenylmethane and polyaminopolyphenylmethane compounds as chain extenders. Among the dozens of compounds specifically mentioned is 3,3′,5,5′-tetraisopropyl-4,4′-diaminodiphenylmethane.

However, both U.S. Pat. No. 3,428,610 and British Pat. No. 1,408,943 are restricted to a two step prepolymer process in which an isocyanate is reacted with a polyol in a first step, and in the second step the resulting prepolymer is reacted with the diamine to form a polyurethane-polyurea elastomer. The British Patent discloses that the reason a prepolymer method is used is because it is important that the reactivity of the polyisocyanates and polyamines be adjusted to a similar level. The polyisocyanates are made less reactive by reacting them with the polyol before the reaction with the diamine. See British Pat. No. 1,408,943, page 1, lines 28–32.

British Pat. No. 1,534,258 on the other hand, discloses the use of certain diamines as chain extenders for the production of polyurethane-polyurea elastomers by the reaction injection molding (RIM) technique. This patent indicates that prepolymers are not required to reduce the reactivity of the polyisocyanates when a RIM process is used. The diamines included as chain extenders in the patent are any active aromatic diamines or higher polyamines. An active diamine is defined as one whose reactivity towards isocyanates has not been reduced by electron attracting substituents. According to the patent, this definition includes unsubstituted compounds such as 2,4′- and/or 4,4′-diaminodiphenylmethane and methyl substituted compounds such as 2,4- and 2,6-diaminotoluene.

The patent further states that aromatic amines which have proved to be particularly suitable as chain extenders, contain at least one linear alkyl substituent in the ortho-position to the first amino group and two linear alkyl substituents having from 1 to 3 carbon atoms in the ortho positions to the second amino group. Examples of such compounds include 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, and 3,3′,5,5′-tetraethyl-4,4′-diaminodiphenylmethane.

Furthermore, the patent says that it is preferred to use aromatic diamines which have a linear alkyl substituent having from 1 to 3 carbon atoms and in both orthopositions to each amino group. It states that for processing by the RIM process, it is advantageous that one of these diamines is liquid at room temperature and miscible with polyhydroxyl compounds in any proportion. In this regard, 1-methyl-3,5-diethyl-2,4-diaminobenzene or a mixture of this compound with 1-methyl-3,5-diethyl-2,6-diaminobenzene is the preferred compound to use as a chain extender.

In contrast to the teachings of British Pat. No. 1,534,258, the applicants have found that certain aromatic diamines with non linear alkyl substituents in the ortho position to the amino groups provide unexpected advantages over aromatic diamines with linear substituents as chain extenders in the preparation of molded polyurethane-polyurea parts by RIM processes.

SUMMARY OF THE INVENTION

The process of this invention comprises reacting an organic polyisocyanate with a reactive polyol composition. The reactive polyol composition comprises a polyol and an aromatic diamine having the following structural formula:

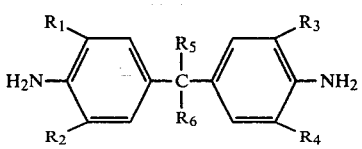

wherein $R_1$, $R_2$, $R_3$, and $R_4$ are individually selected from the group consisting of hydrogen and alkyl radicals of 1 to 4 carbon atoms, and at least one of the radicals in each ring is a non-linear alkyl radical selected from the group consisting of isopropyl, isobutyl, and tertiary butyl radicals, and wherein $R_5$ and $R_6$ are individually selected from the group consisting of hydrogen and alkyl radicals of 1 to 4 carbon atoms. Mixtures of isomers of the reactive O-substitued diamines may also be employed in accordance with this invention. A RIM process is preferably used for preparing molded polyurethane parts by this process.

The process of this invention provides an advantage over the process described in British Pat. No. 1,534,258. The aromatic diamines of this invention are soluble in the polyol and the reactivity of the aromatic diamines with the organic polyisocyanate is slow enough for large mold cavities to be completely filled so that the parts are completely shaped. This advantage over the prior art is achieved without detriment to the mechanical properties of the elastomers and without increases in the cycle time.

These advantages are unexpected because British Pat. No. 1,534,258 suggests that the preferred diamines for RIM have linear substituents rather than non-linear substituents.

The statements herein will be supported in the description and examples which follow.

DESCRIPTION OF THE PREFERRED EMBODIMENT

As was previously mentioned, the subject invention relates to a process for preparing molded polyurethane-polyurea elastomers by reacting an organic polyisocyanate with a reactive polyol composition which contains certain aromatic diamines as chain extenders. Catalysts, blowing agents, fillers, surfactants, and various other ingredients may also be incorporated into the reaction mixtures. The molded polyurethane-polyurea elastomers are preferably prepared by the use of RIM technology.

In preparing the polyurethane-polyurea elastomers of the subject invention, any suitable organic polyisocyanate or mixture thereof can be employed. Representative organic polyisocyanates correspond to the following formula:

$$R''(NCO)_z$$

wherein R'' is a polyvalent organic radical which is either aliphatic, aralkyl, alkaryl, aromatic or mixtures thereof, and z is an integer which corresponds to the valence of R'' and is at least two. Representative of the organic polyisocyanates contemplated herein includes, for example, aromatic diisocyanates such as 2,4-toluene diisocyanate, 2,6-toluene diisocyanate, mixtures of 2,4- and 2,6-toluene diisocyanate, crude toluene diisocyanate, diphenylmethane diisocyanate, crude diphenylmethane diisocyanate and the like; aromatic triisocyanates such as 4,4',4''-tri-phenylmethane triisocyanate, 2,4,6-toluene triisocyanates; aromatic tetraisocyanates such as 4,4'-dimethyldiphenylmethane-2,2',5,5'-tetraisocyanate, and the like; arylalkyl polyisocyanates such as xylene diisocyanate; aliphatic polyisocyanates such as hexamethylene-1,6-diisocyanate, lysine diisocyanate methylester and the like, and mixtures thereof. Other organic polyisocyanates include hydrogenated methylene diphenylisocyanate, m-phenylene diisocyanate, naphthalene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine. Included within the useable isocyanates are modifications of the above isocyanates which contain carbodiimide, allophonate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test, as described by Kohler in *Journal of the American Chemical Society*, Vol. 49, page 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

The amount of organic polyisocyanate that is employed should generally be sufficient to provide about 0.7 equivalent to 1.4 equivalents of isocyanate per equivalent of hydroxyl plus primary amine, preferably from 0.9 equivalent to 1.15 equivalents of organic polyisocyanate per equivalent of hydroxyl plus primary amine.

The reactive polyol compositions which are reacted with the organic polyisocyanates are mixtures of a polyol and certain reactive diamines. The polyols which may be used will generally have an equivalent weight of from 700 to 4000 and an average functionality of from 2 to 6. Suitable polyols include: hydroxyl-terminated polyesters; polyoxyalkylenepolyether polyols; alkylene oxide adducts of organic compounds having at least 2 reactive hydrogen atoms such as amines, and thiols; and hydroxy-terminated acetals.

Any suitable hydroxy-terminated polyester may be used such as are obtained, for example, from the reaction of polycarboxylic acids or polycarboxylic acid anhydrides and polyhydric alcohols. Any suitable polycarboxylic acid may be used in the preparation of hydroxy-terminated polyesters such as succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, phthalic acid, isophthalic acid, terephthalic acid, hemimellitic acid, and 1,4-cyclohexanedicarboxylic acid. Anhydrides such as phthalic, tetrachlorophthalic, tetrabromophthalic, maleic, and 1,4,5,6,7,7-hexachlorobicyclo-(2,2,1)-5-heptane-2,3-dicarboxylic acid anhydride also may be used in the preparation of the hydroxy-terminated polyesters. Any suitable polyhydric alcohol, including both aliphatic and aromatic, may be reacted with the polycarboxylic acid or polycarboxylic acid anhydride to prepare the hydroxy-terminated polyesters. Representative examples include ethylene glycol, 1,3-propanediol, 1,2-propane glycol, 1,4-butanediol, 1,3-butanediol, 1,2-butane glycol, 1,5-pentanediol, 1,4-pentanediol, 1,3-pentanediol, 1,6-hexanediol, 1,7-heptanediol, 2-butene-1,4-diol glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenolic compounds such as 2,2-bis(4-hydroxyphenyl)propane, commonly known as Bisphenol A and hydroxyalkyl ethers of such phenolic compounds such as bis-2-hydroxyethyl ether of hydroxyquinone, and the alkyelne oxide adducts of the abovenamed polyhydric alcohols.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Polyoxyalkylene ether polyols are preferably used as the polyol. These compounds are prepared by reacting on alkylene oxide with a polyhydric alcohol. Any suitable polyhydric alcohol may be used in the preparation of the polyoxyalkylene polyether polyol, such as those disclosed above for use in the preparation of the hydroxy-terminated polyesters. Any suitable alkylene oxide may be reacted with the polyhydric alcohol to prepare the polyoxyalkylene polyol. Representative examples include ethylene oxide, propylene oxide, butylene oxide, amylene oxide, styrene oxide, or mixtures thereof. Polyoxyalkylene polyols derived from two or more oxides may possess either block or heteric structure. In addition to polyoxyalkylene polyols, other compounds such as polyols derived from tetrahydrofuran and alkylene oxide-tetrahydrofuran mixtures may be used. The polyoxyalkylene polyether polyols preferably have primary hydroxyl groups, but may have secondary hydroxyl groups, and preferably, are polyethers prepared from alkylene oxides having from two to six carbon atoms such as polyethylene ether glycols, polyoxypropylene ether glycols and polyoxybutylene ether glycols. The polyoxyalkylene polyether polyols may be prepared by any known process such as, for example, the process disclosed by Wurtz in 1859 and in *Encyclopedia of Chemical Technology*, Vol. 7, pp. 257–262, published by Interscience Publishers, Inc. (1951), or the process disclosed in U.S. Pat. No. 1,922,459. Alkylene oxide adducts of Mannich condensation products are also useful in the invention.

In addition to the polyoxyalkylene polyether polyols just described, graft polyoxyalkylene polyether polyols may also be used in the preparation of the reactive polyol composition. These polyols are prepared by the in situ polymerization of a vinyl monomer or monomers in a reactive polyol medium and in the presence of a free radical initiator. The reaction is generally carried out at a temperature ranging from about 40° C. to 150° C. A more comprehensive discussion of the graft polyols and their method of preparation can be found in U.S. Pat. Nos. 4,208,314, 3,383,351 (Re. 28,715), 3,304,273, 3,652,639, and 3,823,201 (Re. 29,014), the disclosures of which are hereby incorporated by reference.

As was previously mentioned, other suitable polyols, which can be used in the reactive polyol composition of this invention, include the alkylene oxide adducts or organic compounds having at least 2 active hydrogens, such as amines and thiols. The alkylene oxides which are useful in this regard are the same as those described in connection with the preparation of polyoxyalkylene polyether polyols.

Suitable thiols which may be reacted with an alkylene oxide include alkane thiols containing at least two —SH groups such as 1,2-ethanedithiol, 1,2-proanedithiol, 1,3-propanedithiol, and 1,6-hexanedithiol; and alkenethiols such as 2-butene-1,4-dithiol, and alkynethiols such as 3-hexyne-1,6-dithiol.

Suitable polyamines which can be reacted with an alkylene oxide include aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propanediamine, 1,4-butanediamine, and 1,3-butanediamine, as well as substituted secondary derivatives thereof.

As was previously mentioned, hydroxy-terminated polyacetals may also be used as polyols in accordance with this invention. These may be prepared, for example, by the reaction of formaldehyde or other suitable aldehyde with a dihydric alcohol or an alkylene oxide such as those previously described.

The polyols heretofore described are mixed with reactive diamines of the following formula to make the reactive polyol composition:

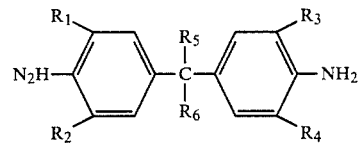

wherein $R_1$, $R_2$, $R_3$, and $R_4$ individually are hydrogen or alkyl radicals of 1 to 4 carbon atoms, and at least one of the alkyl radicals in each ring is a non-linear alkyl radical selected from the group consisting of isopropyl, isobutyl, and tertiary butyl radicals, and wherein $R_5$ and $R_6$ are individually selected from the group consisting of hydrogen and alkyl radicals of 1 to 4 carbon atoms.

The reactive diamines of this invention are soluble in the polyol at use temperatures and concentrations. This is in contrast to the linear substituted diaminodiphenylmethane compound, 3,3',5,5'-tetraethyl-4,4'-diaminodiphenylmethane, mentioned in British Pat. No. 1,534,258. Solubility studies on this compound showed that it was less than 5 percent soluble in a polyoxyalkylene polyether polyol at 25° C. and less than 15 percent soluble in a polyoxyalkylene polyether polyol at 60° C. Consequently, it plugged the reaction injection molding equipment when it was used in the preparation of molded parts.

The reactive diamines of the invention have pK values at 25° C., as determined by titration of a 10:6 isopropanol/water solution of the amine with a 0.1 normal solution of of hydrochloric acid, of at least 10. Amines having a $pK_b$ value of less than 10, as determined by this method, react so rapidly that mixing becomes difficult and the mold cavity is not completely filled when large parts are made. This results in processing problems and high scrap rates. With amines such as 3,3',5,5'-tetraisopropyl-4,4'-diaminodiphenylmethane, for example, parts as large as 10 to 12 pounds can be poured and still be demolded in 15 to 30 seconds.

The following table shows the pK values at 25° C. obtained by the above discussed method for various compounds:

TABLE I

| Compound | $pK_b$ |
| --- | --- |
| 1-methyl-3,5'-diethyl-2,4-diaminobenzene | 9.42 |
| 3,3',5,5'-tetramethyl-4,4'-diaminodiphenylmethane | 9.88 |
| 3,3',5,5'-tetraisopropyl-4,4'-diaminodiphenylmethane | 10.03 |
| 3,3',5,5'-tetraethyl-4,4'-diaminodiphenylmethane | 10.11 |
| 3,3'-diethyl-5,5'-di-sec.butyl-4,4'-diaminodiiphenylmethane | 10.11 |
| 3,5-dimethyl-3',5'-diisopropyl-4,4'-diaminodiphenylmethane | 10.25 |
| 3,3'-dimethyl-5,5'-di-tert.butyl-4,4'-diaminodiphenylmethane | 10.73 |

It is noteworthy that 1-methyl-3,5'-diethyl-2,4-diaminobenzene is the preferred compound mentioned in British Pat. No. 1,534,258 and that it has a $pK_b$ value of less than 10. It is also noteworthy that all of the compounds with a $pK_b$ value greater than 10 are diaminodiphenylmethane compounds with at last one non-linear substituent in each ring except for 3,3',5,5'-tetraethyl-4,4'-diaminodiphenylmethane, and it was previously indicated that this compound was not sufficiently soluble in the polyol to be suitable for RIM processes.

Preferably used as the reactive diamine in the reactive polyol composition is 3,3',5,5'-tetraisopropyl-4,4'-diaminodiphenylmethane. Other representative examples of reactive diamines include: 3,3'-ditertiarybutyl-4,4'-diaminophenylmethane, 3,3'-diethyl-5,5'-diisobutyl-4,4'-diaminophenylmethane, 3,3'-diethyl-5,5'-ditertiarybutyl-4,4'-diaminophenylmethane, 3,3',5,5'-tetrasec.butyl-4,4'-diaminophenylmethane, 3,3',5,5'-tetratet.butyl-4,4'-diaminophenylmethane, 3,3',5-trisec.butyl-4,4'-diphenylmethane, 3,3'-dimethyl-5,5'-ditertiarylbutyl-4,4'-diaminophenylmethane.

The amount of reactive diamine to be used in the polyol composition is from 5 percent to 50 percent by weight based on the weight of the polyol. In a particularly preferred embodiment of this invention, the reactive polyol composition comprises, based on 100 parts by weight, from (a) 60 to 85 parts of a polyalkylene polyether polyol having an equivalent weight of from 1,000 to 2,000, and (b) from 15 to 40 parts of a reactive diamine as herein described.

Under certain circumstances, particularly in the preparation of cellular molded parts of polyurethane-polyurea, it may also be advantageous to replace partially the previously described diaminodiphenylmethanes by other chain extenders. The chain extenders advantageously have molecular weights of less than 400, preferably of 30 to 300, and preferably have 2 active hydrogen atoms.

Examples of chain extenders include aliphatic and/or araliphatic diols having 2 to 14, preferably 2 to 6 carbon atoms such as ethylene glycol, 1,10-decanediol, diethylene glycol, dipropylene glycol and preferably 1,4-butanediol, 1,6-hexanediol and bis(2-hydroxyethyl)hydroquinone, triols such as glycerine and trimethylolpropane, and low molecular hydroxyl group-consisting polyalkylene oxides based on ethylene oxide and/or propylene oxide and the above-referenced initiator molecules.

Secondary aromatic diamines can also be used as chain extenders. Examples include N,N'-dialkyl-substituted aromatic diamines which may be substituted by alkyl radicals at the aromatic nucleus having 1 to 20, preferably 1 to 4, carbon atoms in the N-alkyl radical such as N,N'-diethyl-, N,N'-di-secondary butyl-, N,N'-dicyclohexyl-4,4'-diaminodiphenylmethane and N,N'-di-secondary butylbenzidine.

Other chain extenders include 3,3',5,5'-tetra-n-alkyl-substituted 4,4'-diaminodiphenylmethane such as 3,3',5,5'-tetramethyl-, -tetraethyl-, and -tetra-n-propyl-4,4'-diaminodiphenylmethane. Mixtures of the diaminodiphenylmethanes and the above-referenced chain extenders, in a mole ratio of 75:25 to 25:75, preferably approximately 50:50 corresponding to a weight percent relative to polyol of 2 to 50 and particularly for cellular materials of 2 to 10, have proven to work well.

In addition to the previously described ingredients, other ingredients such as surfactants, fillers, pigments, blowing agents, and catalysts can be included in the preparation of a polyurethane-polyurea elastomers.

Surfactants which can be used include polyoxyalkylene derivatives of siloxane or the alkylene oxide adducts of organic compounds containing reactive hydrogen atoms such as the ethylene oxide adducts of alcohols, glycols and phenols. Generally, the surfactants are employed in amounts ranging from about 0.01 part to 5 parts by weight per 100 parts of polyol.

Conventional fillers for use herein include, for example, aluminum silicate, calcium silicate, magnesium silicate, calcium carbonate, barium sulfate, calcium sulfate, glass fibers, carbon black, and silica. The filler, if used, is normally present in an amount ranging from about 5 parts to 50 parts per weight per 100 parts of polyol.

A pigment which can be used herein can be any conventional pigment heretofor disclosed in the art such as titanium dioxide, zinc oxide, iron oxide, antimony oxide, chrome green, chrome yellow, iron blue siennas, molybdate oranges, and organic pigments such as para reds, benzidine yellow, toluidine red, toners, and phthalocyanines.

Conventional blowing agents such as water, halohydrocarbons, hydrocarbons and the like, can be employed herein in their conventional mode. Particularly preferred blowing agent for the preparation of high resilient polyurethane foams is water.

Any of the catalysts employed in the preparation of polyurethane foam can be employed in the subject invention. Representative of these catalysts include the tertiary amine catalysts such as diethylenetriamine, ketimine, tetramethylenediamine, triethylenediamine, tetramethylenediamine, tetramethylguanidine, trimethylpiperazine and the metalo-organic salt catalysts which are polyvalent metal salts of an organic acid having up to about 18 carbon atoms and being void of active hydrogen atoms. The organo portion of the salt may be either linear or cyclic or saturated or unsaturated. Generally, the polyvalent metal has a valence from about 2 to 4. Typical of these salts include: stannous acetate, stannous butyrate, stannous 2-ethylhexoate, stannous laurate, stannous oleate, stannous stearate, stannous octoate, lead cyclopentanecarboxylate, cadmium cyclohexanecarboxylate, lead naphthanate, lead octoate, cobalt naphthenate, zinc naphthenate, bis(phenylmercury)-dodecyl succinate, phenylmercuric benzoate, cadmium napthenate, dibutyltin dilaurate and dibutyltin-di-2- ethylhexoate. Generally these catalysts will be employed in amounts ranging from about 0.01 part to 7.5 parts by weight based on the weight of the polyol.

In preparing the polyurethane-polyurea elastomers of the present invention, any general procedure conventionally utilized for the preparation of polyurethane may be practiced. Generally, such procedure entails the mixing together of ingredients mechanically and/or by the use of high pressure machinery. As was previously mentioned, the polyol compositions described herein for the preparation of polyurethane-polyurea elastomers are particularly useful for the preparation of molded products by the reaction injection molding techniques.

For more complete understanding of the present invention, reference is made to the following non-limiting examples wherein all parts are by weight unless otherwise noted. In the examples which follow, the following abbreviations are employed:

BD—1,4-butanediol.
C-1—dibutyltin dilaurate, a catalyst.
C-2—triethylene diamine, a catalyst.
DA-I—is an isomeric mixture containing 83.4 percent by weight of 3,3',5,5'-tetraisopropyl-4,4'-diaminodiphenylmethane, 8.2 percent by eight of 3,4',5,6'-tetraisopropyl-4,5'-diaminodiphenylmethane, and 8.2 percent by weight of 2,4,4',6'-tetraisopropyl-3,5'-diaminodiphenylmethane.
DA-II—3,3',5,5'-tetraisopropyl-4,4'-diaminodiphenyldimethane.
Isocyanate No. 1—a liquid carbodiimide-modified diphenylmethane diisocyanate with a free NCO content of 29.3 percent.
Isocyanate No. 2—a modified liquid diphenylmethane diisocyanate prepared by reacting diphenylmethane diisocyanate mixture, tripropylene glycol, and dipropylene glycol, said isocyanate having a free NCO content of 23.0 percent.
Isocyanate No. 3—a blend of Isocyanate No. 1 and a prepolymer of diphenylmethane diisocyanate and a 2000 molecular weight polypropylene glycol, said blend having a free NCO content of 26.0 percent.
Polyol A—a graft polyol having a hydroxyl number of 26 prepared by the in situ polymerization of 12 weight percent styrene, 8 weight percent acrylonitrile, and 80 weight percent of a polyol containing unsaturation, said polyol having a hydroxyl number of 33 and prepared by capping with ethylene oxide a heteric adduct of a mixture of propylene oxide and allylglycidylether with glycerine and propylene glycol.
Polyol B—a polyol prepared by the reaction of ethylene oxide with the propylene oxide adduct of trimethylolpropane, said polyol having an average hydroxyl number of 35 and an ethylene oxide content of 13 percent by weight.
Polyol C—a polyol prepared by the reaction of ethylene oxide with the propylene oxide adduct of trimethylolpropane, said polyol having an average hydroxyl number of 35 and an ethylene oxide content of 15 percent by weight.
Polyol D—a graft polyol having an average hydroxyl number of 24 prepared by the in situ polymerization of 22.5 weight percent styrene, 7.5 weight percent acrylonitrile, and 70 weight percent of a polyol containing unsaturation, said polyol having an average hydroxyl number of 33 and prepared by capping with ethylene oxide a heteric adduct of a mixture of propylene oxide and allylglycidylether with glycerine and propylene glycol.
Polyol E—a polyol prepared by the reaction of ethylene oxide with propylene oxide adduct of propylene glycol, said polyol having an average hydroxyl number of 25 and an ethylene oxide content of 20 percent by weight.

The physical properties of the polyurethane-polyurea compositions prepared in the following examples were determined in accordance with the following test methods:

| | |
|---|---|
| Density | ASTM D-3489 |
| Tensile Strength | ASTM D-412 |
| Elongation, % | ASTM D-412 |
| Split Tear, pli. | ASTM D-624 |
| Graves Tear, pli. | ASTM D-624, Type C |
| Hardness, Shore D | ASTM D-2240 |
| Hardness, Shore A | ASTM D-2240 |
| Heat Sag | ASTM D-3769 |
| Flex Recovery | ASTM D-3768 |
| Flex Modulus | ASTM D-3489 |
| Modulus Multiple | ASTM D-3489 |
| Impact Resistance | ASTM D-256 |

During processing, it was noted that the molds were able to be filled completely resulting in parts whose shape conformed to the mold even though injection times of less than five seconds are employed.

The specific ingredients employed and the amounts thereof, and the properties of the resulting molded parts are presented in Table III. These examples illustrate that molded parts with shapes that conform to the mold and with desirable mechanical properties can be prepared.

EXAMPLES 1–10

A series of reactive polyol compositions was prepared by blending DA with various polyols. The specific ingredients employed and amounts thereof are presented in Table II below.

TABLE II

| Example | Polyol, Parts | BD, Parts | DA, Parts |
|---|---|---|---|
| 1 | A 85 | 0 | I 15 |
| 2 | B 75 | 0 | I 25 |
| 3 | A 84 | 11 | I 5 |
| 4 | C 64.45 | 0 | I 35.55 |
| 5 | D 64.45 | 0 | I 35.55 |
| 6 | A 64.45 | 0 | I 35.55 |
| 7 | A 78.4 | 0 | I 21.6 |
| 8 | C 78.4 | 0 | II 21.6 |
| 9 | E 65 | 0 | II 35 |
| 10 | A 65 | 0 | II 35 |

The reactive polyol compositions prepared in Examples 1–10 were homogeneous solutions. No settling was observed in the compositions.

EXAMPLES 11–13

In examples 11–13 several polyurethane-polyurea molded parts were prepared with low pressure metering devices, with the material being filled into an open mold. The equipment used was a NAU UREMATIC A-20S and the parts weighed approximately 300 grams. The specific ingredients employed and amounts thereof, and the properties of the resulting molded parts are presented in Table III which follows. Although the properties would not be satisfactory for most applications, these examples illustrate that it is possible to prepare molded parts even with low pressure equipment which requires longer reaction times using the amines of this invention.

TABLE III

| Example | 11 | 12 | 13 |
|---|---|---|---|
| Formulation: | | | |
| Polyol Composition of Example 1 | 100 | — | — |
| Polyol Composition of Example 2 | — | 100 | — |
| Polyol Composition of Example 3 | — | — | 100 |
| Isocyanate #1 | — | — | 23.5 |
| Isocyanate #2 | 23.5 | 35.1 | — |
| Properties: | | | |
| Density, pcf. | 65.5 | 64.9 | 66.3 |
| Tensile strength, psi. | 2330 | 2450 | 1300 |
| Elongation, % | 275 | 190 | 200 |
| Split tear, pli. | 73 | 115 | 72 |
| Graves tear, pli. | 420 | 360 | 175 |
| Hardness, Shore D | 37-32 | 48-43 | 40-32 |
| Hardness, Shore A | 85-82 | — | — |
| Heat sag, in. at 250° F. | 0.69 | 0.15 | 1.86 |
| Flex recovery 30 sec./5 min. | 12/6 | 9/5 | 13/8 |
| Flexural modulus, $10^3$, psi. | | | |
| −20° F. | 18.5 | 46.9 | 27.4 |
| 72° F. | 6.4 | 14.0 | 4.9 |
| 158° F. | 4.0 | 9.8 | 2.6 |
| Modulus Multiple −20° F./158° F. | 4.57 | 4.77 | 10.54 |

EXAMPLES 14-27

The system formulations described in Examples 14-27 were processed according to the reaction injection molding (RIM) process using high pressure metering devices in which materials are mixed by means of impingement mixing. The equipment used was as EMB Puromat 30. For specific description of the RIM provess, see "Polyurethane Reaction Injection Molding: Materials, and Properties", L. J. Lee, *Rubber Chemistry and Technology,* Vol. 53, pages 542 et seq (1980).

The specific ingredients employed and the amounts thereof, and the properties of the resulting molded parts are presented in Table IV. These examples illustrate that molded parts with shapes that conform to the mold and with desirable strength properties can be prepared with DA-I.

TABLE IV

| Example | 14 | 15 | 16 | 17 | 18 | 19 | 20 | 21 |
|---|---|---|---|---|---|---|---|---|
| Formulation: | | | | | | | | |
| Polyol Composition of Example 5 | 100 | 100 | — | — | — | — | — | — |
| Polyol Composition of Example 6 | — | — | 100 | 100 | 100 | — | — | — |
| Polyol Composition of Example 7 | — | — | — | — | — | 100 | 100 | 100 |
| C-2 | 0.04 | 0.04 | 0.04 | 0.04 | 0.04 | 0.04 | 0.04 | 0.04 |
| C-1 | 0.05 | 0.05 | 0.05 | 0.05 | 0.05 | 0.05 | 0.05 | 0.05 |
| Isocyanate No. 2 | 41.9 | 41.9 | 43.5 | 43.5 | 43.5 | 30.0 | 30.0 | 30.0 |
| Properties: | | | | | | | | |
| Annealing, min. | | | | | | | | |
| 325° F. | — | — | — | 60 | — | — | 60 | — |
| 250° F. | 60 | — | 60 | — | — | 60 | — | — |
| Density, pcf. | 66.4 | 67.2 | 65.4 | 62.2 | 66.2 | 66.1 | 66.1 | 66.3 |
| Tensile Strength, pi. | 3605 | 3150 | 4393 | 4360 | 4287 | 3165 | 3153 | 3333 |
| Elongation, % | 208 | 220 | 163 | 177 | 187 | 218 | 243 | 228 |
| Graves Tear, pi. | 793 | 730 | 857 | 878 | 893 | 558 | 585 | 552 |
| Shore "D" Hardness | 66/63 | 64/61 | 67/64 | 64/61 | 67/64 | 51/49 | 48/46 | 51/48 |
| IZOD Impract, Ft.-lb./in. | N.B. | N.B. | 9.7 | N.B. | N.B. | N.B. | N.B. | N.B. |
| Heat Sag, in. (325° F., 6" overhang) | 2.76 | 2.89 | 1.80 | 0.82 | 2.28 | 2.85 | 2.43 | 2.80 |
| Flex Modulus, K psi. | | | | | | | | |
| 158° F. | 50.6 | 46.4 | 53.3 | 53.7 | 54.2 | 15.8 | 17.7 | 15.1 |
| R.T. | 94.7 | 95.2 | 93.3 | 91.0 | 118.6 | 38.7 | 42.8 | 40.2 |
| −20° F. | 185.7 | 198.3 | 187.5 | 173.9 | 204.1 | 72.1 | 72.9 | 78 |
| Modulus ratio | 3.67 | 4.27 | 3.52 | 3.24 | 3.77 | 4.57 | 4.13 | 5.19 |
| Coefficient of Thermal Expansion, $10^{-6}/°F$. | | | | | | | | |

| Example | 22 | 23 | 24 | 25 | 26 | 27 |
|---|---|---|---|---|---|---|
| Formulation: | | | | | | |
| Polyol Composition of Example 4 | 100 | 100 | 100 | 100 | 100 | 100 |
| C-2 | 0.04 | 0.04 | 0.04 | 0.04 | 0.04 | 0.04 |
| C-1 | 0.057 | 0.07 | 0.07 | 0.07 | 0.07 | 0.07 |
| Isocyanate No. 2 | 42.8 | 42.8 | 42.8 | — | — | — |
| Isocyanate No. 1 | — | — | — | 33.4 | 33.4 | 33.4 |
| Properties: | | | | | | |
| Annealing, min. | | | | | | |
| 325° F. | — | 60 | — | — | — | 60 |
| 250° F. | 60 | — | — | — | 60 | — |
| Density, pcf. | 65.8 | 65.7 | 65.7 | 66.0 | 65.6 | 65.9 |
| Tensile Strength, pi. | 3442 | 3537 | 3370 | 2780 | 3187 | 3438 |
| Elongaton, % | 263 | 290 | 338 | 227 | 215 | 223 |
| Graves Tear, pi. | 744 | 736 | 714 | 573 | 604 | 612 |
| Shore "D" Hardness | 60/58 | 58/55 | 59/57 | 52/50 | 52/50 | 52/50 |
| IZOD Impact, Ft.-lb./in. | N.B. | N.B. | N.B. | N.B. | N.B. | N.B. |
| Heat Sag, in. | 2.58 | 1.27 | 2.92 | 2.25 | 1.73 | 0.85 |

TABLE IV-continued

| (325° F., 6 overhang) Flex Modulus, K psi. | | | | | | |
|---|---|---|---|---|---|---|
| 158° F. | 40.9 | 42.8 | 37.2 | 29.4 | 29.0 | 28.5 |
| R.T. | 68.0 | 67.0 | 66.9 | 54.4 | 52.6 | 50.6 |
| −20° F. | 121.8 | 111.3 | 123.7 | 66.6 | 65.0 | 63.6 |
| Modulus ratio | 2.98 | 2.60 | 3.33 | 2.27 | 2.24 | 2.23 |
| Coefficient of Thermal Expansion, $10^{-6}$/°F. | 87 | 91 | 75 | 89 | 93 | 94 |

EXAMPLES 28-39

The system formulations described in Examples 28-42 were processed according to the previous Examples. In Examples 28-42, however, DA-II was issued to illustrate the effects of using a pure diamine rather than a mixture of isomers.

The heat sag values for Examples 28-42 should be compared to the heat sag values for Examples 14-27. A comparison shows that DA-II (the pure 3,3′,5,5′-tetraisopropyl-4,4′-diaminodiphenylurethane) provides elastomers which are more resistant to heat than those prepared with DA-I.

The specific ingredients employed to the amounts thereof, and the properties of the resulting molded parts are given in Table V.

TABLE V

| Example | 28 | 29 | 30 | 31 | 32 | 33 |
|---|---|---|---|---|---|---|
| Formulation: | | | | | | |
| Polyol Composition of Example 10 | 100 | 100 | 100 | 100 | 100 | 100 |
| Polyol Composition of Example 8 | — | — | — | — | — | — |
| C-2 | 0.02 | 0.02 | 0.02 | 0.02 | 0.02 | 0.02 |
| C-1 | 0.05 | 0.05 | 0.05 | 0.05 | 0.05 | 0.05 |
| Isocyanate No. 2 | 42.8 | 42.8 | 42.8 | — | — | — |
| Isocyanate No. 3 | — | — | — | 37.5 | 37.5 | 37.5 |
| Isocyanate No. 1 | — | — | — | — | — | — |
| Properties: | | | | | | |
| Annealing, min. | | | | | | |
| 250° F. | — | 60 | — | — | 60 | — |
| 325° C. | — | — | 60 | — | — | 60 |
| Density, pcf. | 62.4 | 62.0 | 62.1 | 63.1 | 63.6 | 63.9 |
| Tensile Strength, psi. | 3987 | 4363 | 4410 | 3455 | 3990 | 4250 |
| Elongation, % | 152 | 157 | 138 | 163 | 178 | 170 |
| Graves Tear, pi. | 934 | 979 | 983 | 746 | 802 | 857 |
| Shore "D" Hardness | 68/65 | 68/65 | 67/65 | 62/59 | 62/60 | 63/60 |
| IZOD Impact, ft-lb./in. | 5.6 | 7.3 | 7.2 | 7.0 | 7.2 | 7.9 |
| Heat Sag, in. (325° F., 6" overhang) | 1.39 | 1.01 | 0.65 | 1.16 | 1.19 | 0.42 |
| Flex Modulus, K psi | | | | | | |
| 158° F. | 62.4 | 62.0 | 62.1 | 50.2 | 49.7 | 49.5 |
| R.T. | 107.1 | 105.0 | 103.8 | 141.5 | 141.5 | 141.9 |
| −20° F. | 198.6 | 190.3 | 188.6 | 141.5 | 141.5 | 141.9 |
| Coefficient of Thermal Expansion, $10^{-6}$/°F. | 86 | 86 | 85 | 86 | 87 | 85 |

| Example | 34 | 35 | 36 | 37 | 38 | 39 |
|---|---|---|---|---|---|---|
| Formulation: | | | | | | |
| Polyol Composition of Example 10 | 100 | 100 | 100 | — | — | — |
| Polyol Composition of Example 8 | — | — | — | 100 | 100 | 100 |
| C-2 | 0.02 | 0.02 | 0.02 | 0.04 | 0.04 | 0.04 |
| C-1 | 0.05 | 0.05 | 0.05 | 0.07 | 0.07 | 0.07 |
| Isocyanate No. 2 | — | — | — | 29.3 | 29.3 | 29.3 |
| Isocyanate No. 3 | — | — | — | — | — | — |
| Isocyanate No. 1 | 34.0 | 34.0 | 34.0 | — | — | — |
| Properties: | | | | | | |
| Annealing, min. | | | | | | |
| 250° F. | — | 60 | — | — | 60 | — |
| 325° F. | — | — | 60 | — | — | 60 |
| Density, pcf. | 62.9 | 62.4 | 62.4 | 66.1 | 65.9 | 66.1 |
| Tensile Strength, psi. | 3032 | 3617 | 4190 | 1583 | 1605 | 1517 |
| Elongation, % | 140 | 160 | 162 | 423 | 387 | 410 |
| Graves Tear, pi. | 675 | 745 | 800 | 425 | 455 | 383 |
| Shore "D" Hardness | 61/58 | 61/59 | 61/59 | 38/35 | 37/35 | 37/34 |
| IZOD Impact, ft-lb./in. | 3.8 | 5.8 | 5.8 | N.B. | N.B. | N.B. |
| Heat Sag, in. (325° F., 6" overhang) | 1.12 | 0.98 | 0.44 | 2.63 | 1.88 | 2.70 |
| Flex Modulus, K psi | | | | | | |
| 158° F. | 46.5 | 49.2 | 49.4 | 10.1 | 11.9 | 9.1 |
| R.T. | 73.2 | 74.5 | 76.1 | 115.8 | 18.0 | 16.0 |
| −20° F. | 122.5 | 128.7 | 125.7 | 33.4 | 33.9 | 34.1 |

TABLE V-continued

| | | | | | | |
|---|---|---|---|---|---|---|
| Modulus ratio | 2.64 | 2.62 | 2.54 | 3.30 | 2.85 | 3.73 |
| Coefficient of Thermal Expansion, $10^{-6}/°F$. | 85 | 89 | 88 | 118 | 93 | 96 |

EXAMPLES 40-45

The system formulations described in Examples 40-45 were processed in accordance with Examples 14-27. In Examples 40-45, DA-II was used. However, Polyol E was used as the polyol to illustrate the effects of using a diol instead of a triol. A comparison of the heat sag values of Examples 40-45 with the values of Examples 14-27 also shows that DA-II provides elastomers which are more resistant to heat than those prepared with DA-I.

The specific ingredients employed and the amounts thereof, and the properties of the resulting molded parts are given in Table VI.

TABLE VI

| Example | 40 | 41 | 42 | 43 | 44 | 45 |
|---|---|---|---|---|---|---|
| Formulation: | | | | | | |
| Polyol Composition of Example 9 | 100 | 100 | 100 | 100 | 100 | 100 |
| C-1 | 0.04 | 0.04 | 0.04 | 0.04 | 0.04 | 0.04 |
| C-2 | 0.09 | 0.09 | 0.09 | 0.09 | 0.09 | 0.09 |
| Isocyanate No. 1 | 33.5 | 3.58 | 3.58 | — | — | — |
| Isocyanate No. 3 | — | — | — | 37 | 37 | 37 |
| Properties: | | | | | | |
| Annealing, min. | | | | | | |
| 325° F. | — | — | 60 | — | — | 60 |
| 250° F. | — | 60 | — | — | 60 | — |
| Density, pcf. | 64.2 | 64.1 | 64.4 | 62.3 | 62.7 | 62.5 |
| Tensile Strength, pi. | 2250 | 2717 | 2782 | 2878 | 3167 | 3043 |
| Elongation, % | 347 | 367 | 262 | 348 | 345 | 285 |
| Graves Tear, pi. | 588 | 658 | 699 | 627 | 661 | 660 |
| Shore "D" Hardness | 52/49 | 53/49 | 54/51 | 54/50 | 54/51 | 54/51 |
| IZOD Impact, Ft.-lb./in. | 9.3 | 8.8 | 10.2 | 9.9 | 10.0 | 9.7 |
| Heat Sag, in. (325° F., 6" overhang) | 1.27 | 1.21 | 0.44 | 1.26 | 1.16 | 0.46 |
| Flex Modulus, K psi. | | | | | | |
| 158° F. | 28.5 | 29.1 | 28.1 | 29.2 | 29.6 | 28.5 |
| R.T. | 43.0 | 43.5 | 42.5 | 43.5 | 45.0 | 43.8 |
| −20° F. | 72.68 | 73.93 | 71.67 | 75.1 | 78.4 | 76.1 |
| Modulus ratio | 2.55 | 2.54 | 2.54 | 2.57 | 2.65 | 2.67 |
| Coefficient of Thermal Expansion, $10^{-6}/°F$. | 99 | 101 | 103 | 100 | 97 | 101 |

The embodiments of the invention in which an exclusive privilege or property is claimed are defined as follows:

1. A process for preparing molded polyurethane-polyurea elastomers comprising reacting an organic polyisocyanate and a reactive polyol composition by reaction injection molding techniques, said reactive polyol composition comprising
   (a) a polyol having an equivalent weight of from 700 to 4,000 and a functionality from 2 to 6; and
   (b) from 15 to 40 parts by weight, based upon 100 parts of (a) plus (b), of a reactive aromatic ciamine which is soluble in said polyol at use temperatures and concentrations, has a $pK_b$ value greater than 10, and has the following structural formula:

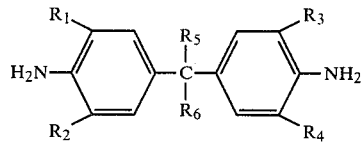

wherein $R_1$, $R_2$, $R_3$, and $R_4$ are individually selected from the group consisting of hydrogen and alkyl radicals of 1 to 4 carbon atoms, and at least one of the alkyl radicals in each ring is a non-linear alkyl radical selected from the group consisting of isopropyl, isobutyl, and tertiary butyl radicals, and wherein $R_5$ and $R_6$ are individually selected from the group consisting of hydrogen and alkyl radicals of 1 to 4 carbon atoms.

2. The process of claim 1 wherein the diamine is 3,3',5,5'-tetraisopropyl-4,4'-diaminodiphenylmethane.

3. The process of claim 1 carried out in the presence of a blowing agent and catalyst.

4. The process of claim 1 wherein the polyol is a polyoxyalkylene polyether polyol.

5. The process of claim 1 wherein the ratio of organic polyisocyanate to reactive polyol composition is such that 0.9 to 1.15 isocyanate groups are present per hydroxyl plus primary amine group.

6. A molded polyurethane-polyurea part prepared in accordance with claim 1, 2, 3, 4 or 5.

7. A reactive polyol composition comprising
   (a) a polyol having an equivalent weight of from 700 to 4,000 and a functionality from 2 to 6; and
   (b) from 15 to 40 parts, based upon 100 parts of (a) plus (b), of a reactive aromatic diamine which is soluble in said polyol at use temperatures and concentration, has a $pK_b$ value greater than 10, and has the following structural formula:

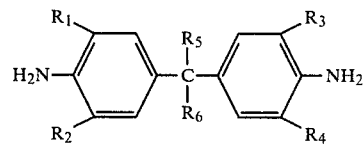

wherein $R_1$, $R_2$, $R_3$, and $R_4$ are individually hydrogen or alkyl radicals of 1 to 4 carbon atoms and at least one of the alkyl radicals in each ring is a non-linear alkyl radical selected from the group consisting of isopropyl radicals, and wherein $R_5$ and $R_6$ are individually selected from the group consisting of hydrogen and alkyl radicals of 1 to 4 carbon atoms.

8. The reactive polyol composition of claim 7 wherein the polyol is a polyoxyalkylene polyether polyol.

9. A reactive polyol composition of claim 8 wherein the diamine is 3,3′,5,5′-tetraisopropyl-4,4′-diaminodiphenylmethane.

* * * * *